United States Patent Office 2,967,196
Patented Jan. 3, 1961

2,967,196
ETHYLENEDIAMINEDIACETIC ACIDS CONTAINING PHENOLIC GROUPS

Harry Kroll, Warwick, John V. Simonian, Greenwood, and Martin Knell, Warwick, R.I., assignors to Geigy Chemical Corporation, New York, N.Y., a corporation of Delaware No Drawing. Filed Dec. 6, 1955, Ser. No. 551,208

7 Claims. (Cl. 260—507)

The present invention relates to a class of compounds capable of chelating polyvalent metal ions in neutral and alkaline aqueous solutions so that the metal ions so bound may no longer be precipitated by insolubilizing anions. The invention also relates to a process for the preparation of these novel and useful chelating agents. Still further, this invention relates to chelating agents which can be used for treating trace metal deficiencies, particularly iron, which occur in plants grown on alkaline soils.

The commercial applications of water-soluble chelating agents are well established. The most widely used compound of this class is ethylenediaminetetraacetic acid (hereinafter referred to as EDTA). In laundering operations, this compound has found extensive application in overcoming the deleterious effect of calcium and magnesium present in hard water. The calcium EDTA, as the disodium salt, has been used clinically for the treatment of lead and other heavy metal poisoning. Numerous other applications of EDTA and its metal chelates have been described in the scientific and commercial literature. More recently the iron chelate of EDTA has been used in soil applications to treat iron deficiencies occurring in citrus grown on the acid soils of central Florida.

Although the valuable properties of EDTA are recognized and utilized, the EDTA chelates of tri- and tetravalent metal ions are unstable in neutral and alkaline solutions, and these metal chelates hydrolyze in water to form insoluble metal hydroxides or hydrated metal oxides. The monosodium salt of the ferric EDTA chelate decomposes in aqueous solutions at pH 8 to ferric hydroxide and a soluble EDTA salt. This behavior imposes a serious limitation on the use of EDTA. It has already been indicated that the ferric EDTA chelate is effective in correcting iron deficiencies in plants grown on acid soils; however, in alkaline soils, this compound is economically ineffective in treating this mineral deficiency. Soil scientists have established that in alkaline soils ferric EDTA decomposes to liberate the iron as an insoluble ferric oxide in which form the metal ion cannot be absorbed by the root system of the plant and therefore is not available for mineral nutrition. In order to overcome this defect of alkaline soils, the iron chelate of hydroxyethylethylenediaminetriacetic acid has also been recommended for plant nutrition, and although it is somewhat better than the EDTA chelate, it is economically ineffective for correcting iron chlorosis in calcareous soils.

A primary object of the present invention is to provide chelating agents which are free of the afore-described deficiencies.

According to this invention, compounds having the structure

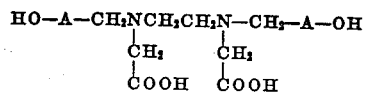

where A is an aromatic mono- or polycyclic hydrocarbon containing as substituents H, alkyl, carboxyl, or sulfonate groups, and a hydroxyl group ortho to the methylene group binding the aromatic nucleus to the ethylene diamine chain, are provided. These compounds have outstanding properties as chelating agents, and the iron chelates of these compounds are effective in correcting iron deficiencies occurring in plants grown on alkaline soils.

It has been demonstrated that where iron chelates are used in plant nutrition, the metal chelate is absorbed intact by the plant and the chelating agent can be shown to be present in the plant tissues. Thus, if metal chelates or the free chelating agent is used for treating trace metal deficiencies in plants, it is essential that the organic molecule be devoid of phytotoxic properties. For this reason, the chlorinated phenolic compounds, for example—which are toxic for use on plants—are without the scope of the present invention.

The usual practice in preparing compounds of this class is to prepare the chloromethyl derivative of the appropriately substituted phenol, and to react two equivalents of this derivative with disodium ethylenediamine diacetate. Although this reaction in some instances produces favorable results, it limits the number of compounds which may be prepared because of the difficulty of synthesizing the desired ortho chloromethyl phenols. In practice, it would be more desirable to carry out a Mannich type reaction in which the appropriately substituted phenol, formaldehyde, and disodium ethylenediamine diacetate were allowed to react together to yield the desired product. However, when a Mannich reaction is carried out as indicated above, the resulting product is predominantly the substituted o,o'-dihydroxy diphenylmethane. This is probably due to the greater reactivity of the phenolic components of this reaction. The difficulty is solved by the present invention, according to which formaldehyde reacts with disodium ethylenediaminediacetate to form the dimethylol derivative which can condense with para-substituted phenols ortho to the phenolic group. The reaction of formaldehyde with disodium ethylenediaminediacetate is rapid and is complete within one hour. The reaction may be carried out at temperatures ranging between 20° C. to 100° C., and in water-soluble alcohols such as methyl, ethyl, propyl, isopropyl, or tertiary butyl alcohol, as the reaction medium. The condensation of the dimethylol derivative with the phenol takes place preferably in aqueous methyl alcohol at a pH ranging from 6 to 11, preferably between 8 and 10. The duration of the reaction depends on the reactivity of the phenol; thus beta-naphthol reacts rapidly at room temperature whereas the para-phenolsulfonic acid and disodium dimethyloldiacetate require reflux temperature for eight hours.

The ferric chelates can be prepared by several methods and the isolation of the metal chelate depends on its solubility in the solvent. The simplest method of preparation is the direct addition of an aqueous solution of a ferric salt to an aqueous methanol solution of the chelating agent. The formation of the chelate in solution is accompanied by the development of a deep red color. Spectrophotometric measurements on the intensity of the red color can be conveniently used for the analysis of the iron chelate.

Alternative methods for the preparation of the iron chelate are dependent on the solubility of the final product. Thus the ferric chelate of bis (5-methyl-2-hydroxybenzyl)ethylenediaminediacetic acid is precipitated from aqueous solution as the acid:

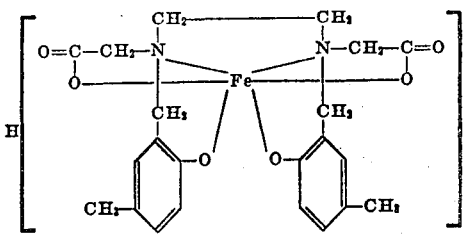

The compound can be redissolved by the addition of alkali.

Finally the iron chelate can be conveniently made by dissolving freshly precipitated ferric hydroxide with the theoretical amount of the acid form of the chelating agent.

The course of the chemical reactions are visualized in the following equations:

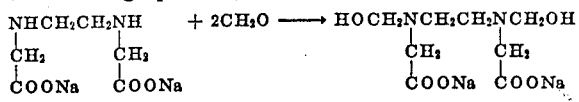

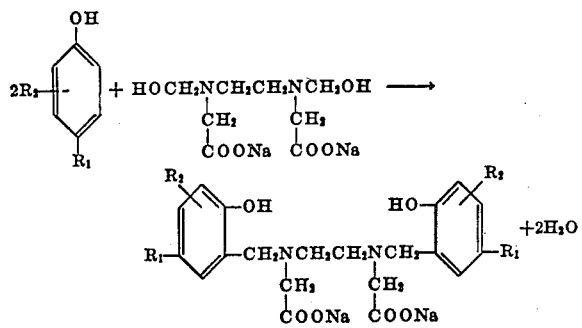

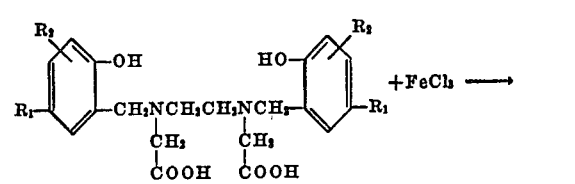

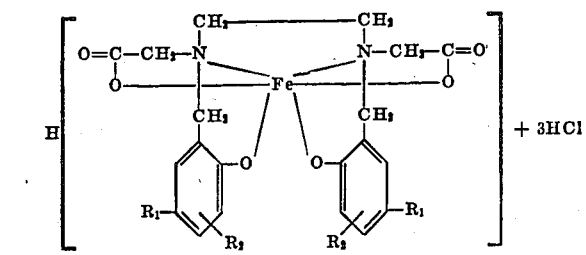

$R_1$=alkyl ($C_1$—$C_{12}$), COOH, $SO_3Na$ or $SO_3H$
$R_2$=alkyl ($C_1$—$C_{12}$) or H The following examples illustrate presently-preferred embodiments of the invention, including preferred N,N'-bis-(o-hydroxybenzyl)-ethylenediaminediacetic acids and their ferric chelates. In these examples, parts and percentages are by weight.

EXAMPLE 1

*N,N'-bis-(2-hydroxy-3,5-dimethylbenzyl)-ethylenediaminediacetic acid*

A mixture consisting of 23.5 parts of a 46.7% aqueous solution of disodium ethylenediaminediacetate, 25 parts of methanol and 8.05 parts of 37% aqueous formaldehyde is refluxed for 1 hour. To this mixture is added portionwise a solution of 12.2 parts of 2,4-dimethylphenol and 50 parts of methanol. The mixture is refluxed for 8 hours. The homogeneous mixture is cooled and crystallization induced by scratching. The white crystals which separate are filtered, washed with acetone and dried in air. In this manner, there are obtained 12 parts of N,N' - bis - (2 - hydroxy - 3,5 - dimethylbenzyl) - disodium ethylenediaminediacetate

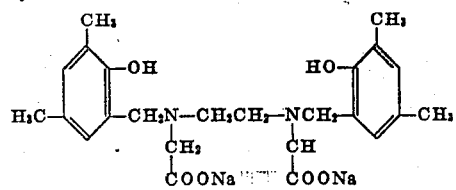

The free acid is obtained by adjusting the pH of an aqueous solution of the disodium salt to 4.5–5.0 with e.g. hydrochloric acid. The solid which separates is filtered, washed with water and dried. The yield is 95%.

EXAMPLE 2

*N,N'-bis-(2-hydroxy-5-methylbenzyl)-ethylenediaminediacetic acid*

To 47 parts of a 46.7% aqueous solution of disodium ethylenediaminediacetate in 40 parts of methanol are added 16.1 parts of a 37% aqueous solution of formaldehyde. This mixture is added dropwise over a period of 1 hour to a solution of 21.7 parts of p-cresol and 75 parts of methanol under reflux. The mixture is then allowed to react under reflux for an additional 8 hours. The resulting homogeneous mixture is evaporated to dryness and the residue is pulverized and washed with acetone. 39 parts by weight of the so-obtained disodium salt are dissolved in water, and the pH of the aqueous solution adjusted to 4.5–5.0, whereupon a 72% yield of N,N' - bis - (2 - hydroxy - 5 - methylbenzyl) - ethylenediamine-diacetic acid.

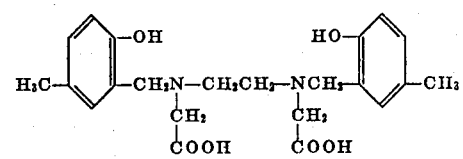

is obtained.

EXAMPLE 3

*N,N' - bis - (2 - hydroxy - 5 - t - butylbenzyl)-ethylenediaminediacetic acid*

16.1 parts of a 37% aqueous solution of formaldehyde are added to 47 parts of a 46.7% aqueous solution of disodium ethylenediaminediacetate in 40 parts of methanol. This homogeneous solution is added dropwise over a period of 1 hour to a refluxing solution of 30.04 parts of para-t-butylphenol in 75 parts of methanol. The mixture is allowed to react for 8 hours under reflux at which time a heavy oil will have separated. Crystallization of the oil is induced by scratching and cooling in an acetone-Dry Ice bath. To this heterogeneous mixture is added an equal volume of acetone and the slurry filtered and washed with acetone and dried. A white solid, 32 parts by weight, is obtained as the disodium salt

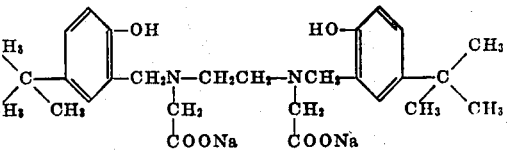

An aqueous solution of the disodium salt is adjusted to pH 4.5–5.0 with concentrated hydrochloric acid. The separated product is filtered, washed with water and dried in vacuo. The yield is 74%.

EXAMPLE 4

*N,N' - bis - (2 - hydroxy - 5 - sulfobenzyl) - disodium-ethylenediaminediacetate*

To a mixture of 47 parts of a 46.7% aqueous solution of disodium-ethylenediaminediacetate in 40 parts of methanol are added 16.1 parts of a 37% aqueous solution of formaldehyde. This mixture is added portionwise over a period of 15 minutes to a refluxing solution of 77.5 parts of a 45% solution of the sodium salt of p-phenolsulfonic acid and 40 parts of methanol which had been previously adjusted to pH 8 with 50% aqueous sodium hydroxide. The homogeneous mixture is allowed to react under reflux for an additional 8 hours. The product precipitates upon the addition of twice the volume of acetone and is filtered, washed with acetone and dried under vacuum. In this manner a yield of 40 parts by weight of N,N' - bis - (2 - hydroxy -5- sulfobenzyl)-tetrasodium ethylenediaminediacetate

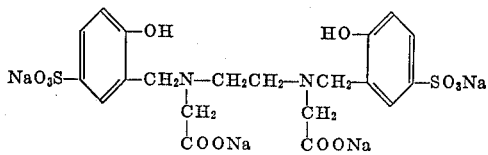

is obtained. The tetrasodium salt is dissolved in a minimum of water. Enough glacial acetic acid is added with cooling and the separated solid is filtered, washed with acetone and dried in vacuo. The yield of free acid is 55% of theoretical.

EXAMPLE 5

*N,N' - bis - (2 - hydroxy - 5 - methylbenzyl) - dipotassium-ethylenediaminediacetate*

A heterogeneous mixture of 17.6 parts of ethylenediaminediacetic acid, 200 parts of methanol, 7.82 parts of potassium hydroxide and 6.6 parts of para-formaldehyde is warmed under reflux a period of time until the mixture becomes homogeneous. This mixture is cooled to room temperature (about 20° to 30° C.) and added dropwise over a period of 7 hours to a refluxing solution consisting of 21.7 parts of p-cresol and 50 parts of methanol. After complete addition, the mixture is allowed to reflux for 1 hour. The homogeneous mixture is cooled and 1500 parts of acetone are added portionwise while stirring. The separated solid is filtered, washed with acetone and dried in vacuo. The yield of the product is 27 parts by weight.

EXAMPLE 6

*N,N' - bis - (2 - hydroxy - 5 - carboxybenzyl)-ethylene-diaminediacetic acid*

22.7 parts by weight of disodium-ethylenediaminediacetate are dissolved in 30 parts of water, added to 40 parts of methanol, and mixed with 16.2 parts of 37% aqueous formaldehyde. This mixture is added dropwise to a solution of 27.6 parts of p-hydroxybenzoic acid in 75 parts of methanol at pH 11 over a period of 15 minutes. The mixture is refluxed for 8 hours. The mixture is then evaporated to dryness and the resulting residue is pulverized and washed with acetone. In this manner is obtained a 95% yield of the tetrasodium salt

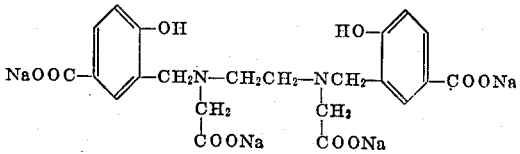

The pH of an aqueous solution is adjusted to 4.5–5.0 and the precipitate formed is filtered, washed with acetone and dried in vacuo. The desired product (free acid) is obtained in a 90% yield.

EXAMPLE 7

*N,N' - bis - (2 - hydroxy - 5 - octylbenzyl) - ethylene-diaminediacetic acid*

Forty-seven parts of a 46.7% aqueous solution of disodium ethylenediaminediacetate in 40 parts of methanol are mixed with 16.1 parts of a 37% solution of formaldehyde. This solution is added over a period of 1 hour to a solution of 41.3 parts of p-t-octylphenol in 75 parts of methanol under reflux. The mixture is allowed to reflux for 8 hours and cooled. Crystallization of the oil that separates is induced by scratching and cooling in an acetone-Dry Ice bath. The separated solid is filtered, washed with acetone and dried in a vacuum desiccator. In this manner, there are obtained 47 parts of N,N'-bis-(2-hydroxy-5-octylbenzyl)-disodium ethylenediaminediacetate

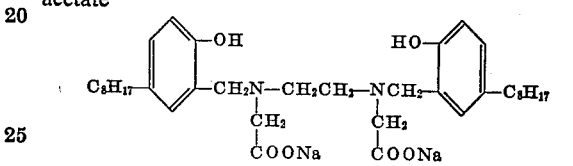

The free acid is obtained by adjusting the pH of a hot methanolic solution of the disodium salt to 4.5–5.0 and adding an equal volume of water. The separated solid is filtered and dried in vacuum desiccator. The yield is 95%.

EXAMPLE 8

*Iron chelate of N,N'-bis-(2-hydroxy-5-methylbenzyl) ethylenediaminediacetic acid*

To 30.4 parts of N,N'-bis-(2-hydroxy-5-methylbenzyl)-disodium ethylenediaminediacetate (78%) in 25 parts of water are added 2 parts of NaOH in 5 parts of water. 13.7 parts by weight of 59.3% ferric chloride in 20 parts of water are added portionwise while stirring. The red-purple solid that separates is stirred for 2 hours and filtered and dried in vacuo at 60–70° C. In this manner 30 parts by weight of the desired product is obtained.

EXAMPLE 9

*Iron chelate of N,N'-bis-(2-hydroxy-5-sulfobenzyl)- tetrasodium ethylenediaminediacetate*

A mixture of 21.1 parts of N,N'-bis-(2-hydroxy-5-sulfobenzyl)-tetrasodium ethylenediaminediacetate (75%) in 5 parts of water and 1 part of NaOH in 5 parts of water is allowed to react with 6.85 parts by weight of ferric chloride (59.3%) in 10 parts of water. The colored homogeneous mixture is evaporated to dryness. The yield of the solid is 23 parts by weight.

In like manner, iron chelates of the other hereindisclosed chelating agents can be prepared.

The chelating agents can be evaluated for their effectiveness in translocating iron into plants by measuring the uptake of chelated radioactive iron by, for example, bean plants grown on an alkaline Utah soil having a high calcium carbonate content and a pH of 7.7.

Solutions of the radioactive iron chelates are prepared by making up 10 ml. solutions containing 5 mgs. of iron containing $Fe^{59}$ having an activity of 5 microcuries, and a molar equivalent amount of chelating agent. The solutions are uniformly mixed into one pint quantities of soil using a mechanical mixer. Six lima bean seeds are planted in each soil. After two or three weeks growth, the plants are harvested. The plants are dried to constant weight at 70° C. and then ground in a Wiley mill through a No. 20 mesh screen. The radioactive iron present in the plant tissue is determined by accurately weighing a 0.5 gm. sample of plant material into a 15 x 75 mm. test tube and placing the tube in a "well type" scintillation counter. The data obtained is tabulated in Table I.

TABLE I.—UPTAKE OF Fe BY BEAN PLANTS GROWN ON ALKALINE UTAH SOIL

| | Compound (as Fe$^{+3}$ chelates) | p.p.m. of Fe |
|---|---|---|
| 1 | control (non chelated Fe$^{+3}$) | 0.81 |
| 2 | EDTA | 1.09 |
| 3 | Versenol [1] | 5.13 |
| 4 | N,N'-bis-(3,5-dimethyl-2-hydroxybenzyl)-ethylenediaminediacetic acid | 39.8 |
| 5 | N,N'-bis-(5-sulfo-2-hydroxybenzyl)-ethylenediaminediacetic acid | 36.8 |
| 6 | N,N'-bis-(2-hydroxynaphthyl)-ethylenediaminediacetic acid | 36.3 |

[1] Versenol—hydroxyethylethylenediaminetriacetic acid.

The data in Table I indicate that the hydroxybenzyl-ethylenediaminediacetic acid derivatives (compounds 4, 5 and 6) are seven times as effective as Versenol in translocating iron into the growing bean plants.

The foregoing examples are of course not limitative of the scope of the invention but only representative thereof. Thus, various changes can be made therein within the scope of invention as introductorily defined. For instance, the process of Example 2 may be carried out mutatis mutandis with other phenols than the recited p-cresol, as for example, with a phenol wherein the $CH_3$ group of the cresol is replaced by an alkyl group of up to 12 carbon atoms. Thus, if use is made for instance of para-dodecylphenol, the corresponding N,N'-bis-(2-hydroxy-5-dodecylbenzyl)-ethylenediaminediacetic acid will be obtained. Moreover, if use is made of an ammonium ethylenediaminediacetate as a starting compound, the corresponding ammonium salt will be obtained.

Having thus disclosed the invention what is claimed is:

1. A method for the preparation of a compound of the formula $$HO-A(R_1)(R_2)-CH_2N(Y)-CH_2CH_2-N(Y)CH_2-A(R_1)(R_2)-OH$$

wherein A is a benzene ring containing $R_1$ and $R_2$ as sole further substituents in addition to the —OH group, $R_1$ is a member selected from the group consisting of H and lower alkyl, $R_2$ is a member selected from the group consisting of lower alkyl, $SO_3M$ and COOM and is in para position to the aromatic hydroxy group, which in turn is ortho to the carbon atom in the benzene ring bonded to the methylene group attached to the ethylenediamine structure, and Y represents a —$CH_2COOM$ group, M being a member selected from the group consisting of hydrogen, an alkali metal ion and an ammonium ion, which comprises refluxing the corresponding dimethylolethylenediaminediacetate of the formula $$HO-CH_2N(Y)-CH_2CH_2-N(Y)CH_2-OH$$

wherein Y is as precedingly defined, in aqueous medium with a phenol of the formula $$HO-A(R_1)(R_2)$$

wherein A, $R_1$ and $R_2$ are as precedingly defined.

2. A method for the preparation of a compound of the formula

[structure: N,N'-bis-(hydroxy-methylbenzyl with R substituent)-ethylenediaminediacetate, M salt]

wherein R is a lower alkyl group and M is an alkali metal ion, which comprises refluxing the corresponding salt of dimethylol-ethylenediaminediacetate in aqueous medium with the corresponding para-alkylphenol.

3. A method for the preparation of a compound of the formula

[structure with $CH_3$ ortho substituents on both phenol rings]

wherein M is an alkali metal ion, which comprises refluxing the corresponding salt of dimethylol-ethylenediaminediacetate in aqueous medium with para-cresol.

4. A method for the preparation of a compound of the formula

[structure with 3,5-dimethyl substitution on both phenol rings]

wherein M is an alkali metal ion, which comprises refluxing the corresponding salt of dimethylol-ethylenediaminediacetate in aqueous medium with 2,4-dimethylphenol.

5. A method for the preparation of a compound of the formula

[structure with tert-butyl groups on both phenol rings]

wherein M is an alkali metal ion, which comprises refluxing the corresponding salt of dimethylol-ethylenediaminediacetate in aqueous medium with para-tertiary butyl-phenol.

6. A method for the preparation of a compound of the formula

[structure with $SO_3M$ groups para on both phenol rings]

wherein M is an alkali metal ion, which comprises refluxing the corresponding salt of dimethylol-ethylenediaminediacetate in aqueous medium with para-phenolsulfonic acid.

7. A method for the preparation of a compound of the formula

[structure with COOM groups para on both phenol rings]

wherein M is an alkali metal ion, which comprises refluxing the corresponding salt of dimethylol-ethylenediaminediacetate in aqueous medium with para-hydroxybenzoic acid.

References Cited in the file of this patent

UNITED STATES PATENTS

| 2,321,620 | Pratt | June 15, 1943 |
| 2,493,654 | Calvin | Jan. 3, 1950 |
| 2,493,986 | McNab | Jan. 10, 1950 |
| 2,562,198 | McKinney et al. | July 31, 1951 |
| 2,624,757 | Bersworth | Jan. 6, 1953 |
| 2,624,760 | Bersworth | Jan. 6, 1953 |